US011071008B2

(12) United States Patent
Lin

(10) Patent No.: US 11,071,008 B2
(45) Date of Patent: Jul. 20, 2021

(54) TRANSMISSION METHOD, APPARATUS AND SYSTEM FOR FEEDBACK ACKNOWLEDGE INFORMATION

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/623,736

(22) PCT Filed: Jul. 14, 2017

(86) PCT No.: PCT/CN2017/093015
§ 371 (c)(1),
(2) Date: Dec. 17, 2019

(87) PCT Pub. No.: WO2019/010705
PCT Pub. Date: Jan. 17, 2019

(65) Prior Publication Data
US 2020/0178118 A1    Jun. 4, 2020

(51) Int. Cl.
*H04W 4/00*    (2018.01)
*H04W 28/04*    (2009.01)
(Continued)

(52) U.S. Cl.
CPC .......... *H04W 28/04* (2013.01); *H04L 1/1812* (2013.01); *H04L 1/1854* (2013.01); *H04W 72/1289* (2013.01)

(58) Field of Classification Search
USPC .......................................... 370/328, 254; 1/1
See application file for complete search history.

(56) References Cited

U.S. PATENT DOCUMENTS 9,615,267 B2 * 4/2017 Fu ........................ H04L 1/1861
9,722,737 B2 * 8/2017 Fu ........................ H04L 1/1854
(Continued)

FOREIGN PATENT DOCUMENTS

CN    101895377 A    11/2010
CN    102136895 A    7/2011
(Continued)

OTHER PUBLICATIONS

Partial Supplementary EP Search Report for EP Application 17917279.6 dated May 28, 2020.
(Continued)

*Primary Examiner* — David Q Nguyen

(57) ABSTRACT

A transmission method, apparatus and system for feedback acknowledge information are provided. The method includes: receiving by a terminal device downlink control information sent by an access network device, the downlink control information comprising a first information field and a second information field, wherein the first information field is used for indicating a timing relationship of a feedback acknowledge information corresponding to the downlink control information and the second information field is used to indicate a downlink allocation index; and determining, according to the first information field and the second information field, the number of first bits of the feedback acknowledge information transmitted in a target transmission unit.

17 Claims, 5 Drawing Sheets

(51) Int. Cl.
*H04L 1/18* (2006.01)
*H04W 72/12* (2009.01)

(56) References Cited

U.S. PATENT DOCUMENTS

| | | | | |
|---|---|---|---|---|
| 10,560,902 | B2* | 2/2020 | Gao | H04W 72/0446 |
| 2012/0269179 | A1 | 10/2012 | Li et al. | |
| 2013/0336160 | A1* | 12/2013 | Yin | H04L 5/0055 |
| | | | | 370/254 |
| 2017/0063516 | A1* | 3/2017 | Miao | H04L 1/1887 |
| 2017/0310426 | A1* | 10/2017 | Fan | H04L 1/0013 |
| 2018/0248660 | A1* | 8/2018 | Parkvall | H04L 1/1812 |
| 2018/0279266 | A1* | 9/2018 | Li | H04B 7/0456 |

FOREIGN PATENT DOCUMENTS

| | | | | |
|---|---|---|---|---|
| CN | 102237927 | A | 11/2011 | |
| CN | 104756430 | A | 7/2015 | |
| CN | 106105078 | A | 11/2016 | |
| CN | 106712912 | A | 5/2017 | |
| CN | 106714320 | A | 5/2017 | |
| RU | 2533652 | C2 | 11/2014 | |
| RU | 2587674 | C2 | 6/2016 | |
| RU | 2602385 | C1 | 11/2016 | |
| WO | 2015018040 | A1 | 2/2015 | |
| WO | WO-2017050265 | A1* | 3/2017 | H04W 72/042 |

OTHER PUBLICATIONS

GPP TSG-RAN WG1 #89; Hangzhou, China, May 15-19, 2017; R1-1709102.
3GPP TSG RAN WG1 Meeting #89; Hangzhou, China, May 15-19, 2017; R1-1708151.
3GPP TSG RAN WG1 Meeting #89; Hangzhou, P.R. China May 15-19, 2017; R1-1708025.
3GPP TSG RAN WG1 NR Ad-Hoc#2; Qingdao, P.R. China, Jun. 27-30, 2017; R1-1711517.
3GPP TSG-RAN WG1 NR Ad-Hoc#2; Qingdao, China, Jun. 27-30, 2017; R1-1711510.
3GPP TSG RAN WG1 NR Ad-Hoc#2; Qingdao, P.R. China Jun. 27-30, 2017; R1-1710998.
English translation of the Russia Decision on Grant for RU Application 2019140657/07(079542) dated Aug. 20, 2020.
Extended European Search Report for EP Application 17917279.6 dated Sep. 1, 2020.
China First Office Action with English Translation for CN Application 201911377764.1 dated Nov. 3, 2020.
Canada First Examination Report for CA Application 3,066,171 dated Mar. 3, 2021. (4 pages).
European Examination Report for EP Application 17917279.6 dated Apr. 1, 2021. (6 pages).
IN First Examination Report for IN Application 201917054313 dated Apr. 24, 2021.
Chile First Office Action with English Translation for CL Application 2020-000001 dated Apr. 27, 2021.

* cited by examiner

TRANSMISSION METHOD, APPARATUS AND SYSTEM FOR FEEDBACK ACKNOWLEDGE INFORMATION

CROSS-REFERENCE TO RELATED APPLICATION(S)

This application is a 371 application of International Application No. PCT/CN2017/093015, filed on Jul. 14, 2017, the entire disclosure of which is hereby incorporated by reference.

TECHNICAL FIELD

Implementations of the present disclosure relate to the communication field, in particular to a transmission method, apparatus and system of feedback acknowledge information.

BACKGROUND

In a Hybrid Auto Repeat Request (HARQ) mechanism, feedback acknowledge information is information that a terminal device feeds back to an access network device after receiving downlink data sent by the access network device. In a New Radio (NR) system, an access network device dynamically indicates HARQ timing of feedback acknowledge information to a terminal device, and a process for a terminal device to transmit feedback acknowledge information according to the timing indicated by the access network device comprises: the access network device schedules a Physical Downlink Shared Channel (PDSCH) to transmit downlink data in the $n^{th}$ slot, and indicates a value k corresponding to the timing in a Downlink Grant (DL grant) corresponding to the PDSCH, then the terminal device transmits feedback acknowledge information corresponding to the PDSCH in the $(n+k)^{th}$ slot according to the value k corresponding to the timing.

However, the method is only applicable to the case where a terminal device transmits feedback acknowledge information corresponding to one PDSCH in one slot.

SUMMARY

The implementations of the present disclosure provide a transmission method, apparatus and system of feedback acknowledge information. Technical solutions are as follows.

According to a first aspect of an implementation of the present disclosure, there is provided a transmission method of feedback acknowledge information, and the method comprises: receiving, by a terminal device, downlink control information sent by an access network device, wherein the downlink control information comprises a first information field and a second information field, the first information field is used for indicating timing of feedback acknowledge information corresponding to the downlink control information, and the second information field is used for indicating a downlink assignment index; determining, by the terminal device, a first bit number of feedback acknowledge information to be transmitted in a target transmission unit according to the first information field and the second information field; and transmitting, by the terminal device, the feedback acknowledge information in the target transmission unit according to the first bit number.

In at least one implementation, the timing of feedback acknowledge information corresponding to the downlink control information comprises: a time interval between downlink data scheduled through the downlink control information and feedback acknowledge information corresponding to the downlink data; or, a time interval between the downlink control information and feedback acknowledge information corresponding to the downlink control information.

In at least one implementation, the first bit number comprises: the maximum bit number of feedback acknowledge information corresponding to one carrier; or, the maximum bit number of feedback acknowledge information corresponding to all Component Carriers.

In at least one implementation, the determining, by the terminal device, the first bit number of feedback acknowledge information to be transmitted in the target transmission unit according to the first information field and the second information field, comprises: when the terminal device receives first downlink control information, calculating the first bit number of the feedback acknowledge information to be transmitted in the target transmission unit through a following formula: N=C*(K+1) or N=C*K; wherein a value of the second information field of the first downlink control information is a preset value, the C is a first preset value, the K is a value corresponding to the first information field in the first downlink control information, and both C and K are positive integers.

In at least one implementation, the determining, by the terminal device, the first bit number of feedback acknowledge information to be transmitted in the target transmission unit according to the first information field and the second information field, comprises: when the terminal device receives first downlink control information, calculating the first bit number of the feedback acknowledge information to be transmitted in the target transmission unit through a following formula: N=C*(K−T); wherein a value of the second information field of the first downlink control information is a preset value, the C is a first preset value, the K is a value corresponding to the first information field in the first downlink control information, the T is a second preset value, the C, T, and K are positive integers, and T is less than K.

In at least one implementation, the determining, by the terminal device, the first bit number of feedback acknowledge information to be transmitted in the target transmission unit according to the first information field and the second information field, comprises: determining the first bit number of feedback acknowledge information to be transmitted in the target transmission unit according to the first information field and the second information field of the second downlink control information when the terminal device does not receive first downlink control information and receives second downlink control information; wherein a value of the second information field of the first downlink control information is a preset value, and the second downlink control information is downlink control information other than the first downlink control information.

In at least one implementation, when the terminal device does not receive the first downlink control information and receives the second downlink control information, the determining the first bit number of the feedback acknowledge information to be transmitted in the target transmission unit according to the first information field and the second information field of the second downlink control information, comprises: when the terminal device does not receive the first downlink control information and receives the second downlink control information, calculating the first bit number of the feedback acknowledge information transmitted in the target transmission unit through a following formula: $N=C*(K'+P)$ or $N=C*(K'+P-1)$; wherein the C is a first preset value, K' is a value corresponding to the first information field in the second downlink control information, the P is a value corresponding to the second information field in the second downlink control information, and C, K', and P are all positive integers.

In at least one implementation, when the terminal device does not receive the first downlink control information and receives the second downlink control information, the determining the first bit number of the feedback acknowledge information to be transmitted in the target transmission unit according to the first information field and the second information field of the second downlink control information, comprises: when the terminal device does not receive the first downlink control information and receives the second downlink control information, calculating the first bit number of the feedback acknowledge information transmitted in the target transmission unit through a following formula: $N=C*(K'+P-T)$; wherein the C is a first preset value, the K' is a value corresponding to the first information field in the second downlink control information, the P is a value corresponding to the second information field in the second downlink control information, the T is a second preset value, and C, K', P, and T are all positive integers.

In at least one implementation, the value of the second information field of the first downlink control information is 1.

In at least one implementation, the second preset value is used for indicating the minimum delay of transmitting feedback acknowledge information.

In at least one implementation, the first preset value comprises: a first constant; or, a value preconfigured by the access network device; or, the maximum number of transport blocks; or, a product of the maximum number of transport blocks and a number of code block groups; or, a number of Component Carriers.

In at least one implementation, the second preset value comprises: a second constant; or a value predefined through a communication protocol; or, a value preconfigured by the access network device.

According to a second aspect of an implementation of the present disclosure, there is provided a transmission method of feedback acknowledge information, the method comprising: sending, by an access network device, downlink control information to a terminal device, wherein the downlink control information comprises a first information field and a second information field, the first information field is used for indicating timing of feedback acknowledge information corresponding to the downlink control information, and the second information field is used for indicating a downlink assignment index; determining, by the access network device, a first bit number of feedback acknowledge information to be transmitted in a target transmission unit according to the first information field and the second information field; and receiving, by the access network device, the feedback acknowledge information transmitted by the terminal device in the target transmission unit according to the first bit number.

In at least one implementation, the timing of feedback acknowledge information corresponding to the downlink control information comprises: a time interval between downlink data scheduled through the downlink control information and feedback acknowledge information corresponding to the downlink data; or, a time interval between the downlink control information and feedback acknowledge information corresponding to the downlink control information.

In at least one implementation, the first bit number comprises: the maximum bit number of feedback acknowledge information corresponding to one carrier; or, the maximum bit number of feedback acknowledge information corresponding to all Component Carriers.

In at least one implementation, the determining, by the access network device, the first bit number of feedback acknowledge information to be transmitted in the target transmission unit according to the first information field and the second information field, comprises: according to the first information field and the second information field, calculating, by the access network device, the first bit number of the feedback acknowledge information to be transmitted in the target transmission unit through a following formula: $N=C*(K+1)$ or $N=C*K$; wherein a value of the second information field of the first downlink control information is a preset value, the C is a first preset value, the K is a value corresponding to the first information field in the first downlink control information, and both C and K are positive integers.

In at least one implementation, the determining, by the access network device, the first bit number of feedback acknowledge information to be transmitted in the target transmission unit according to the first information field and the second information field, comprises: according to the first information field and the second information field, calculating, by the access network device, the first bit number of the feedback acknowledge information to be transmitted in the target transmission unit through a following formula: $N=C*(K-T)$; wherein, a value of the second information field of the first downlink control information is a preset value, the C is a first preset value, the K is a value corresponding to the first information field in the first downlink control information, the T is a second preset value, the C, T, and K are positive integers, and T is less than K.

In at least one implementation, the value of the second information field of the first downlink control information is 1.

In at least one implementation, the second preset value is used for indicating the minimum delay of transmitting feedback acknowledge information.

In at least one implementation, the first preset value comprises: a first constant; or, a value preconfigured by the access network device; or, the maximum number of transport blocks; or, a product of the maximum number of transport blocks and a number of code block groups; or, a number of Component Carriers.

In at least one implementation, the second preset value comprises: a second constant; or a value predefined through a communication protocol; or, a value preconfigured by the access network device.

According to a third aspect of an implementation of the present disclosure, there is provided a transmission apparatus of feedback acknowledge information, the apparatus comprising at least one module for implementing the transmission method of feedback acknowledge information provided by the first aspect or any one of the at least one implementations of the first aspect.

According to a fourth aspect of an implementation of the present disclosure, there is provided a transmission apparatus of feedback acknowledge information, the apparatus comprising at least one module for implementing the transmission method of feedback acknowledge information provided by the second aspect or any one of the at least one implementations of the second aspect.

According to a fifth aspect of an implementation of the present disclosure, there is provided a terminal device comprising a processor, a memory, a transmitter, and a receiver.

The memory is used for storing one or more instructions, which are indicated to be executed by the processor.

The receiver is used for receiving downlink control information sent by an access network device, wherein the downlink control information comprises a first information field and a second information field. The first information field is used for indicating timing of feedback acknowledge information corresponding to the downlink control information, and the second information field is used for indicating a downlink assignment index.

The processor is used for determining a first bit number of feedback acknowledge information to be transmitted in a target transmission unit according to the first information field and the second information field.

The transmitter is used for transmitting the feedback acknowledge information in the target transmission unit according to the first bit number.

According to a sixth aspect of an implementation of the present disclosure, there is provided an access network device comprising a processor, a memory, a transmitter, and a receiver.

The memory is used for storing one or more instructions, which are indicated to be executed by the processor. The transmitter is used for sending downlink control information to a terminal device, wherein the downlink control information comprises a first information field and a second information field, the first information field is used for indicating timing of feedback acknowledge information corresponding to the downlink control information, and the second information field is used for indicating a downlink assignment index.

The processor is used for determining a first bit number of feedback acknowledge information to be transmitted in a target transmission unit according to the first information field and the second information field.

The receiver is used for receiving feedback acknowledge information transmitted by the terminal device in the target transmission unit according to the first bit number.

According to a seventh aspect of an implementation of the present disclosure, there is provided a computer readable medium that stores one or more instructions that are loaded and executed by a processor to implement the transmission method of feedback acknowledge information provided by the first aspect or any one of the at least one implementations of the first aspect.

According to an eighth aspect of an implementation of the present disclosure, there is provided a computer readable medium that stores one or more instructions that are loaded and executed by a processor to implement the transmission method of feedback acknowledge information provided by the second aspect or any one of the at least one implementations of the second aspect.

According to a ninth aspect of an implementation of the present disclosure, there is provided a transmission system of feedback acknowledge information, and the transmission system of feedback acknowledge information comprises a terminal device comprising the transmission apparatus of feedback acknowledge information provided in the third aspect or any one of the at least one implementations of the third aspect, and an access network device comprising the transmission apparatus of feedback acknowledge information provided in the fourth aspect or any one of the at least one implementations of the fourth aspect.

According to a tenth aspect of an implementation of the present disclosure, there is provided a transmission system of feedback acknowledge information, and the transmission system of feedback acknowledge information comprises a terminal device and an access network device, the terminal device is a terminal device provided by the fifth aspect or any one of the at least one implementations of the fifth aspect, and the access network device is an access network device provided by the sixth aspect or any one of the at least one implementations of the sixth aspect.

BRIEF DESCRIPTION OF DRAWINGS

In order to explain technical solutions of the implementations of the present disclosure more clearly, drawings referred to in the description of the implementations will be briefly introduced below. Obviously, the drawings in the following description are only some implementations of the present disclosure. For those of ordinary skill in the art, other drawings may be obtained according to those drawings without paying an inventive effort.

DETAILED DESCRIPTION

Figure 1:
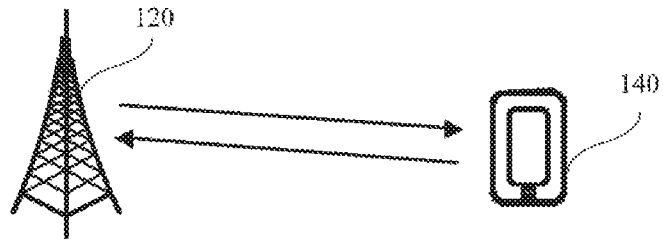
FIG. 1 is a schematic structural diagram of a mobile communication system provided by an example implementation of the present disclosure.

In order to make objects, technical solutions and advantages of the present disclosure more clear, the implementations of the present disclosure will be described in further detail below with reference to the accompanying drawings.

The "first", "second" and similar words mentioned herein do not denote any order, number or importance, but are only used for distinguishing different components. Similarly, similar words such as "a" or "an" do not denote a limitation of number, but rather denote the presence of at least one.

Similar words such as "connect" or "connected" are not limited to physical or mechanical connections, but may comprise electrical connections, whether direct or indirect.

The "module" mentioned herein generally refers to a program or instructions stored in a memory capable of realizing some functions. The "unit" mentioned herein generally refers to a functional structure divided according to logic, and the "unit" may be implemented by pure hardware or a combination of hardware and software.

The "plurality" mentioned herein refers to two or more. "And/or" describes an association relationship of associated objects, indicating that there may be three relationships, for example, A and/or B may represent three situations: A alone, A and B at the same time, and B alone. Symbol "/" generally indicates that objects before and after the symbol "/" is in an "or" relationship.

First of all, several nouns involved in the implementations of the present disclosure are introduced as follows.

1. Downlink information: comprising Downlink Control Information (DCI) and downlink data sent by a terminal device to an access network device.

2. Downlink control information: comprising a first information field for indicating timing of feedback acknowledge information corresponding to the downlink control information and a second information field for indicating a downlink assignment index.

3. timing of feedback acknowledge information corresponding to downlink control information: being used for indicating a target transmission unit for transmitting feedback acknowledge information.

In one implementation, timing of feedback acknowledge information corresponding to downlink control information comprises: a time interval between downlink data scheduled through downlink control information and feedback acknowledge information corresponding to the downlink data.

For example, if a target terminal receives downlink data, scheduled through downlink control information, sent by an access network device in the $n^{th}$ transmission unit, wherein a value corresponding to the timing is k1, then a terminal device determines that a target transmission unit is the $(n+k1)^{th}$ transmission unit, that is, feedback acknowledge information corresponding to the downlink data is transmitted in the $(n+k1)^{th}$ transmission unit.

In another implementation, timing of feedback acknowledge information corresponding to downlink control information comprises: a time interval between downlink control information and feedback acknowledge information corresponding to downlink control information. For example, if a target terminal receives downlink control information sent by an access network device in the $n^{th}$ transmission unit, wherein a value corresponding to the timing is k2, then a terminal device determines that a target transmission unit is the $(n+k2)^{th}$ transmission unit, that is, feedback acknowledge information corresponding to the downlink control information is transmitted in the $(n+k2)^{th}$ transmission unit. In the following, only the second possible implementation will be described as an example.

4. Downlink Assignment Index (DAI): being used for indicating a position order of feedback acknowledge information corresponding to downlink control information in a target transmission unit.

For example, a downlink assignment index is 1 bit, when the downlink assignment index is "1", it is used for indicating that feedback acknowledge information corresponding to downlink control information is first feedback acknowledge information in a target transmission unit, when the downlink assignment index is "2", it is used for indicating that feedback acknowledge information corresponding to downlink control information is second feedback acknowledge information in a target transmission unit, and so on.

5. Feedback acknowledge information: being information that a terminal device feeds back to an access network device after the terminal device receives downlink data sent by the access network device. Feedback acknowledge information is used for indicating whether a terminal device has correctly received downlink data sent by an access network device.

In at least on implementation, feedback acknowledge information comprises Acknowledgement (ACK) and Non-Acknowledgement (NACK). ACK is used for indicating that a terminal device has correctly received downlink data sent by an access network device, and NACK is used for indicating that a terminal device has not correctly received downlink data sent by an access network device.

In at least on implementation, one piece of feedback acknowledge information comprises 1 bit of information.

Some related nouns, such as DCI, PDSCH, ACK/NACK, etc., involved in the implementations of the present disclosure may refer to corresponding related descriptions in 3GPP protocols, which will not be repeated here.

Please refer to FIG. 1, which shows a schematic structural diagram of a mobile communication system provided by an example implementation of the present disclosure. The mobile communication system may be an LTE system or a 5G system. The 5G system is also called a New Radio (NR) system, which is not limited in the implementation. The mobile communication system comprises an access network device 120 and a terminal device 140.

The access network device 120 may be a base station, which may be used for converting received radio frames and IP packet messages to each other, and may also coordinate attribute management of air interfaces. For example, the base station may be an evolutional Node B (eNB or e-NodeB) in LTE, or a base station adopting a centralized and distributed architecture in a 5G system. When the access network device 120 adopts a centralized and distributed architecture, it usually comprises a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a Physical (PHY) protocol stack. The implementation of the present disclosure does not limit a specific implementation of the access network device 120. In at least on implementation, an access network device may comprise a Home eNB (HeNB), a Relay, a Pico base station (PICO), etc.

The access network device 120 and the terminal device 140 establish a wireless connection through a wireless air interface. In at least on implementation, the wireless air interface is a wireless air interface based on the 5G standard, for example, the wireless air interface is a New Radio (NR); or, the wireless air interface may be a wireless air interface based on a next generation mobile communication network technical standard of 5G, or, the wireless air interface may be a wireless air interface based on the 4G standard (a LTE system). The access network device 120 may transmit downlink control information to the terminal device 140 through a wireless connection.

The terminal device 140 may refer to a device that performs data communication with the access network device 120. The terminal device 140 may communicate with one or more core networks via a Radio Access Network (RAN). The terminal device 140 may be a mobile terminal device, such as a mobile phone (or called a "cellular" phone), and a computer having a mobile terminal device, for example, a portable, pocket-sized, handheld, computer-built, or vehicle-mounted mobile apparatus. For example, a Subscriber Unit, a Subscriber Station, a Mobile Station, a Mobile Platform, a Remote Station, an Access Point, a Remote Terminal, an Access Terminal, a User Terminal, a User Agent, a User Device, or a User Equipment (UE). In at least on implementation, the terminal device 140 may be a Relay device, which is not limited in the implementation. The terminal device 140 may receive downlink control information transmitted by the access network device 120 through a wireless connection with the access network device 120.

In at least on implementation, the access network device 120 sends downlink control information comprising a first information field and a second information field to the terminal device 140. The terminal device 140 determines first bit number of feedback acknowledge information to be transmitted in a target transmission unit according to the first information field and the second information field in the downlink control information, and transmits the feedback acknowledge information in the target transmission unit according to the first bit number.

It should be noted that the mobile communication system shown in FIG. 1 may comprise multiple access network devices 120 and/or multiple terminal devices 140. In FIG. 1, one access network device 120 and one terminal device 140 are illustrated, but the implementation is not limited thereto.

Figure 2:
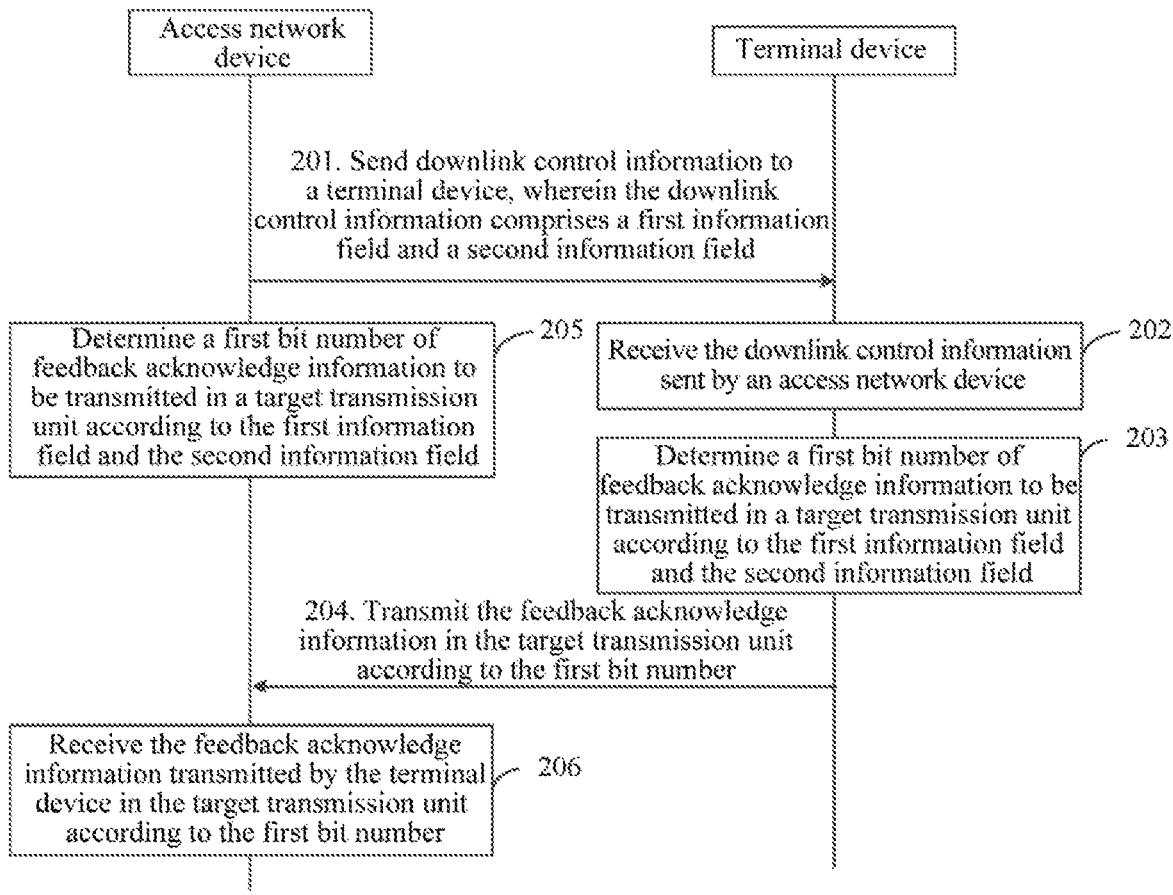
FIG. 2 is a flowchart of a transmission method of feedback acknowledge information provided by an example implementation of the present disclosure.

Please refer to FIG. 2, which shows a flowchart of a transmission method of feedback acknowledge information provided by an example implementation of the present disclosure, which is used in the implementation environment shown in FIG. 1. The method comprises following acts.

In act 201, an access network device sends downlink control information to a terminal device, wherein the downlink control information comprises a first information field and a second information field.

In at least one implementation, the access network device transmits the downlink control information to the terminal device through a downlink channel.

The downlink channel is a Physical Downlink Control Channel (PDCCH); or, it is an Enhanced Physical Downlink Control Channel (EPDCH); or, it is a Physical Downlink Shared Channel (PDSCH); or, it is a downlink channel in a 5G system. The following description will only take the case where a downlink channel is PDSCH as an example.

In at least one implementation, a downlink assignment index is a downlink assignment index within one carrier.

In act 202, the terminal device receives the downlink control information sent by the access network device.

In at least one implementation, the terminal device receives the downlink control information sent by the access network device on a downlink channel.

In act 203, the terminal device determines a first bit number of feedback acknowledge information to be transmitted in a target transmission unit according to the first information field and the second information field.

In at least one implementation, a target transmission unit is a corresponding transmission unit when the terminal device needs to send feedback acknowledge information. Illustratively, a target transmission unit is a time unit within a single carrier, a target transmission unit is symbols of which a number is a, symbol groups of which a number is b, slots of which a number is c, or subframes of which a number is d, wherein a, b, c, and d are positive integers. The implementation is not limited thereto. The following description will only take the case that a target transmission unit is one slot as an example.

In at least one implementation, the first bit number is called the maximum bit number. In one possible implementation, the first bit number comprises the maximum bit number of feedback acknowledge information corresponding to one carrier.

Since each carrier is called a Component Carrier (CC) in a Carrier Aggregation (CA) system and at least two Component Carriers are comprised in the carrier aggregation system, in another possible implementation, a first bit number comprises the maximum bit number of feedback acknowledge information corresponding to all Component Carriers.

Next, only taking the case that a first bit number is the maximum bit number of feedback acknowledge information corresponding to one carrier as an example.

In act 204, the terminal device transmits the feedback acknowledge information in the target transmission unit according to the first bit number.

In at least one implementation, the terminal device sends the feedback acknowledge information to the access network device through an uplink channel.

The uplink channel is a Physical Uplink Control Channel (PUCCH); or, it is a Physical Uplink Shared Channel (PUSCH).

In act 205, the access network device determines a first bit number of feedback acknowledge information to be transmitted in a target transmission unit according to the first information field and the second information field.

It should be noted that acts 203, 204 and 205 may be performed in parallel, and the way in which the access network device determines the first bit number of feedback acknowledge information may refer to the way in which a target terminal determines the first bit number of feedback acknowledge information, which will not be repeated here.

In act 206, the access network device receives the feedback acknowledge information transmitted by the terminal device in the target transmission unit according to the first bit number.

In at least one implementation, the access network device receives the feedback acknowledge information transmitted by the terminal device in the target transmission unit according to the determined first bit number of the feedback acknowledge information.

To sum up, according to the implementation of the present disclosure, a terminal device receives downlink control information sent by an access network device, wherein the downlink control information comprises a first information field for indicating timing of feedback acknowledge information corresponding to the downlink control information and a second information field for indicating a downlink assignment index; thus the terminal device can determine the maximum bit number of feedback acknowledge information to be transmitted in a target transmission unit according to the first information field and the second information field, further the terminal device is enabled to simultaneously feedback multiple pieces of feedback acknowledge information to the access network device in one target transmission unit according to the maximum bit number.

It should be noted that the downlink control information comprises at least two pieces of downlink control information that need to transmit feedback acknowledge information in the same target transmission unit. The downlink control information comprises first downlink control information and second downlink control information, wherein a value of the second information field of the first downlink control information is a preset value, and the second downlink control information is downlink control information other than the first downlink control information.

For example, the preset value is 1, that is, a value of the second information field of the first downlink control information is 1, and downlink control information of which a value corresponding to a second information field is not 1 is called second downlink control information. In the following, only the case that downlink control information comprises various pieces of downlink control information of feedback acknowledge information to be transmitted in the same target transmission unit will be described as an example. Hereinafter, only the case that downlink control information comprises two pieces of downlink control information of feedback acknowledge information to be transmitted in the same target transmission unit will be described as an example.

Figure 3:
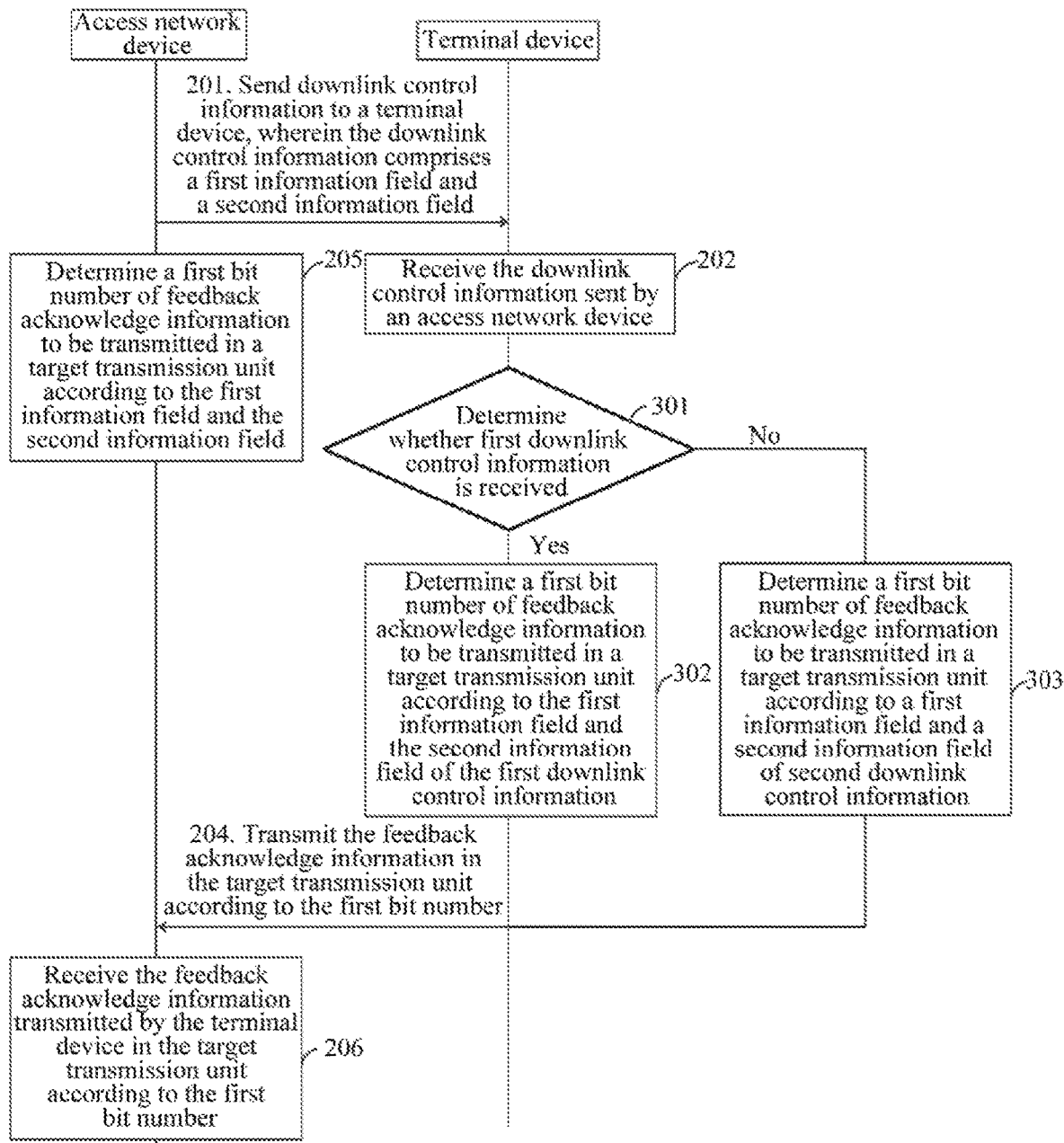
FIG. 3 is a flowchart of a transmission method of feedback acknowledge information provided by another example implementation of the present disclosure.

When an access network device sends at least two pieces of downlink control information to a terminal device, the at least two pieces of downlink control information comprise first downlink control information and at least one piece of second downlink control information. Correspondingly, the terminal device receives the at least two pieces of downlink control information sent by the access network device, comprising two receiving situations: in the first receiving situation, the terminal device receives all the at least two pieces of downlink control information correctly, that is, receives the first downlink control information and at least one piece of second downlink control information; in the second receiving situation, the terminal device has not received all the at least two pieces of downlink control information correctly, that is, has not received the first downlink control information and has received at least one piece of second downlink control information. In at least one implementation, the act 203 may alternatively be implemented as acts 301-303, as shown in FIG. 3.

In act 301, the terminal device determines whether first downlink control information is received.

In at least one implementation, the terminal device searches for whether there is downlink control information with a preset value corresponding to the second information field in the received downlink control information, if yes, it is determined that the terminal device has received the first downlink control information, and the act 302 is executed, if not, it is determined that the terminal device has not received the first downlink control information, and the act 303 is executed.

In act 302, if the terminal device receives the first downlink control information, the terminal device determines a first bit number of feedback acknowledge information to be transmitted in a target transmission unit according to the first information field and the second information field of the first downlink control information.

The terminal device determines the first bit number of feedback acknowledge information to be transmitted in the target transmission unit according to the first information field and the second information field of the first downlink control information, comprising but not limited to following two possible implementations.

In a first possible implementation, a first bit number of feedback acknowledge information to be transmitted in a target transmission unit is calculated by the following formula: $N=C*(K+1)$ or $N=C*K$.

A value of the second information field of the first downlink control information is a preset value, C is a first preset value, K is a value corresponding to the first information field in the first downlink control information, and N, C and K are all positive integers.

In at least one implementation, the first preset value comprises: a first constant; or, a value preconfigured by the access network device; or, the maximum number of transport blocks; or, a product of the maximum number of transport blocks and a number of code block groups; or, a number of Component Carriers.

The maximum number of transport blocks is determined according to a configured transmission mode of a terminal. When the terminal is configured for single codeword transmission, each PDSCH carries at most one transport block, i.e., the maximum number of transport blocks is "1"; when the terminal is configured for double codeword transmission, each PDSCH carries at most two transport blocks, i.e., the maximum number of transport blocks is "2".

In at least one implementation, the number of code block groups is the number of block groups into which one transport block may be divided. For example, a transport block is divided into 4 code block groups, i.e. the number of code block groups is "4".

Figure 4:
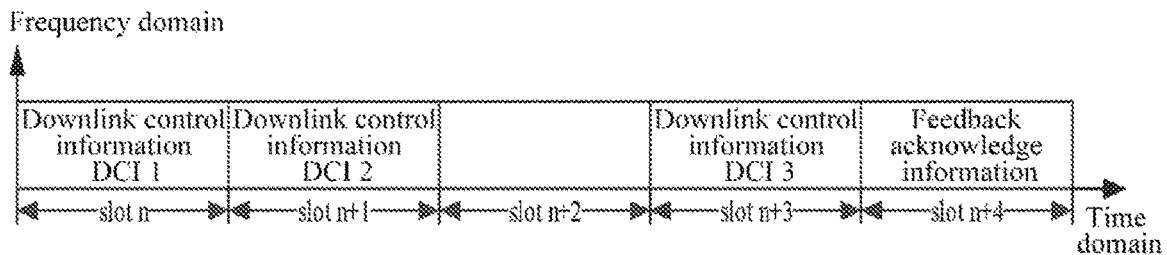
FIG. 4 is a schematic diagram of downlink control information received by a terminal device provided by an example implementation of the present disclosure.

In one illustrative example, as shown in FIG. 4, a terminal device receives downlink control information DCI1 in the $n^{th}$ slot (abbreviated as slot n), a value k1 corresponding to a first information field in DCI1 is "4", and a value DAI1 corresponding to a second information field is "1"; the terminal device receives downlink control information DCI2 in the $(n+1)^{th}$ slot (abbreviated as slot n+1), wherein a value k2 corresponding to a first information field in DCI2 is "3" and a value DAI2 corresponding to a second information field is "2"; and the terminal device receives downlink control information DCI3 in the $(n+3)^{th}$ slot (abbreviated as slot n+3), where a value k3 corresponding to a first information field is "1" and a value DAI2 corresponding to a second information field is "3". According to the determination method of the target transmission unit, feedback acknowledge information corresponding to each of the three pieces of downlink control information needs to be transmitted in the $(n+4)^{th}$ slot (abbreviated as slot n+4). Moreover, since the value DAI1 corresponding to the second information field in DCI1 is "1", DCI1 is first downlink control information, and DCI2 and DCI3 are both second downlink control information.

Hereinafter, only taking the calculation formula "$N=C*K$" as an example, the manner of calculating a first bit number of feedback acknowledge information corresponding to the three pieces of downlink control information comprises but is not limited to the following two possible calculation manners.

In a first possible calculation manner, as shown in Table 1, C is the maximum number of transport blocks, K is a value "4" corresponding to the first information field of DCI1. When a terminal device is configured for single codeword transmission, i.e., the maximum number of transport blocks is "1", a value of C is "1", then a first bit number $N=1*4=4$ bits of feedback acknowledge information is calculated through the calculation formula "$N=C*K$". When the terminal device is configured for double codeword transmission, that is, the maximum number of transport blocks is "2", and a value of C is "2", then a first bit number $N=2*4=8$ bits of feedback acknowledge information is calculated through the calculation formula "$N=C*K$".

TABLE 1

| Calculation formula | Transmission mode | A first preset value C | A value K corresponding to a first information field in first downlink control information | A first bit number N(bit) of feedback acknowledge information |
| --- | --- | --- | --- | --- |
| N = C*K | Single codeword | 1 | 4 | 4 |
|  | Double codeword | 2 | 4 | 8 |

In a second possible calculation manner, as shown in Table 2, C is a product of the maximum number of transport blocks and a number of code block groups, the number of code block groups is "4", and K is a value "4" corresponding to a first information field of DCI1. When a terminal device is configured for single codeword transmission, i.e., the maximum number of transport blocks is "1", and C=1*4=4, then a first bit number of feedback acknowledge information N=4*4=16 bits is calculated by the calculation formula "N=C*K". When the terminal device is configured for double codeword transmission, that is, the maximum number of transport blocks is "2", and C=2*4=8, then a first bit number of feedback acknowledge information N=8*4=32 bits is calculated by the calculation formula "N=C*K".

TABLE 2

| Calculation formula | Transmission mode | A first preset value C | A value K corresponding to a first information field in first downlink control information | A first bit number N(bit) of feedback acknowledge information |
| --- | --- | --- | --- | --- |
| N = C*K | Single codeword | 1*4 | 4 | 16 |
|  | Double codeword | 2*4 | 4 | 32 |

It should be noted that a calculation manner when a first preset value C is a first constant or a value preconfigured by an access network device or a number of Component Carriers may be analogously referred to the above two possible calculation manners and will not be described here.

Another point needed to be noted is that when a calculation formula is "N=C*(K+1)", a manner of calculating a first bit number of feedback acknowledge information corresponding to the three pieces of downlink control information may be analogously referred to the calculation manner when the calculation formula is "N=C*K", and will not be repeated here.

Figure 5:
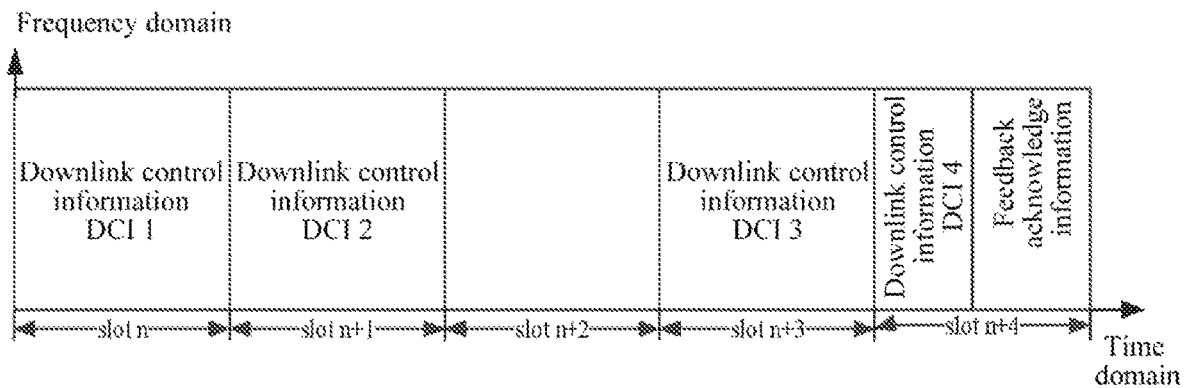
FIG. 5 is a schematic diagram of downlink control information received by a terminal device provided by another example implementation of the present disclosure.

In another illustrative example, as shown in FIG. 5, a terminal device receives downlink control information DCI1 in the $n^{th}$ slot (abbreviated as slot n), a value k1 corresponding to a first information field in DCI1 is "4", and a value DAI1 corresponding to a second information field is "1"; the terminal device receives downlink control information DCI2 in the $(n+1)^{th}$ slot (abbreviated as slot n+1), wherein a value k2 corresponding to a first information field in DCI2 is "3" and a value DAI2 corresponding to a second information field is "2"; the terminal device receives downlink control information DCI3 in the $(n+3)^{th}$ slot (abbreviated as slot n+3), where a value k3 corresponding to a first information field in DCI3 is "1" and a value DAI2 corresponding to a second information field is "3"; and the terminal device receives downlink control information DCI4 in the $(n+4)^{th}$ slot (abbreviated as slot n+4), a value k4 corresponding to a first information field in DCI4 is "0", and a value DAI2 corresponding to a second information field is "4". According to the above determination method of the target transmission unit, feedback acknowledge information corresponding to each of the four pieces of downlink control information needs to be transmitted in the $(n+4)^{th}$ slot.

Hereinafter, only taking the calculation formula "N=C*(K+1)" as an example, the manner of calculating a first bit number of feedback acknowledge information corresponding to the four pieces of downlink control information comprises but is not limited to the following two possible calculation manners.

In a first possible calculation manner, as shown in Table 3, C is the maximum number of transport blocks, K is a value "4" corresponding to a first information field of DCI1. When a terminal device is configured for single codeword transmission, i.e., the maximum number of transport blocks is "1", a value of C is "1", then a first bit number N=1*(4+1)=5 bits of feedback acknowledge information is calculated through the calculation formula "N=C*(K+1)". When the terminal device is configured for double codeword transmission, that is, the maximum number of transport blocks is "2", and a value of C is "2", then a first bit number N=2*(4+1)=10 bits of feedback acknowledge information is calculated through the calculation formula "N=C*(K+1)".

TABLE 3

| Calculation formula | Transmission mode | A first preset value C | A value K corresponding to a first information field in first downlink control information | A first bit number N(bit) of feedback acknowledge information |
|---|---|---|---|---|
| N = C* (K + 1) | Single codeword | 1 | 4 | 5 |
|  | Double codeword | 2 | 4 | 10 |

In a second possible calculation method, as shown in Table 4, C is a product of the maximum number of transport blocks and a number of code block groups, a number of code block groups is "4", and K is a value "4" corresponding to a first information field of DCI1. When a terminal device is configured for single codeword transmission, that is, the maximum number of transport blocks is "1", and C=1*4=4, then a first bit number N=4*(4+1)=20 bits of feedback acknowledge information is calculated through the calculation formula "N=C*(K+1)". When the terminal device is configured for double codeword transmission, that is, the maximum number of transport blocks is "2", and C=2*4=8, then a first bit number of feedback acknowledge information N=8*(4+1)=40 bits is calculated by the calculation formula "N=C*(K+1)".

TABLE 4

| Calculation formula | Transmission mode | A first preset value C | A value K corresponding to a first information field in first downlink control information | A first bit number N(bit) of feedback acknowledge information |
|---|---|---|---|---|
| N = C* (K + 1) | Single codeword | 1*4 | 4 | 20 |
|  | Double codeword | 2*4 | 4 | 40 |

It should be noted that a calculation manner when a first preset value C is a first constant or a value preconfigured by an access network device or a number of Component Carriers, may be analogously referred to the above two possible calculation manners and will not be described here.

Another point needed to be noted is that when a calculation formula is "N=C*K", a manner of calculating a first bit number of feedback acknowledge information corresponding to the four pieces of downlink control information may be analogously referred to the calculation manner when the calculation formula is "N=C*(K+1)", and will not be repeated here.

In a second possible implementation, a terminal device calculates a first bit number of feedback acknowledge information to be transmitted in a target transmission unit by the following formula: N=C*(K−T).

Relevant descriptions of C, K, and N may refer to the relevant details in the above acts and will not be repeated here. T is a second preset value, the second preset value is used for indicating the minimum delay of transmitting feedback acknowledge information, T is a positive integer, and T is less than K.

In at least one implementation, a second preset value comprises: a second constant; or, a value predefined through a communication protocol; or, a value preconfigured by an access network device.

Figure 6:
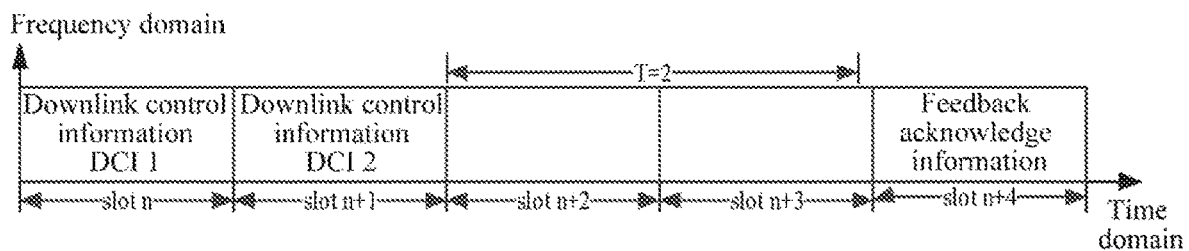
FIG. 6 is a schematic diagram of downlink control information received by a terminal device provided by another example implementation of the present disclosure.

In one illustrative example, as shown in FIG. 6, a terminal device receives downlink control information DCI1 in the $n^{th}$ slot (abbreviated as slot n), a value k1 corresponding to a first information field in DCI1 is "4", and a value DAI1 corresponding to a second information field is "1"; and the terminal device receives downlink control information DCI2 in the $(n+1)^{th}$ slot (abbreviated as slot n+1), wherein a value k2 corresponding to a first information field in DCI2 is "3" and a value DAI2 corresponding to a second information field is "2". According to the determination method of the target transmission unit, feedback acknowledge information corresponding to each of the two pieces of downlink control information needs to be transmitted in the $(n+4)^{th}$ slot (abbreviated as slot n+4). T is a first constant "2".

In the following, taking the calculation formula "N=C* (K−T)" as an example, the manner of calculating a first bit number of feedback acknowledge information corresponding to the four pieces of downlink control information comprises but is not limited to the following possible calculation manners.

In a first possible calculation manner, as shown in Table 5, C is the maximum number of transport blocks, K is a value "4" corresponding to a first information field of DCI1, and a value of T is "2". When a terminal device is configured for single codeword transmission, i.e., the maximum number of transport blocks is "1", a value of C is "1", then a first bit number N=1*(4−2)=2 bits of feedback acknowledge information is calculated through the calculation formula "N=C* (K−T)". When the terminal device is configured for double codeword transmission, that is, the maximum number of transport blocks is "2", and a value of C is "2", then a first bit number N=2*(4−2)=4 bits of feedback acknowledge information is calculated through the calculation formula "N=C*(K−T)".

TABLE 5

| Calculation formula | Transmission mode | A first preset value C | A value K corresponding to a first information field in first downlink control information | A second preset value T | A first bit number N(bit) of feedback acknowledge information |
|---|---|---|---|---|---|
| N = C* (K − T) | Single codeword | 1 | 4 | 2 | 2 |
| | Double codeword | 2 | 4 | 2 | 4 |

In a second possible calculation manner, as shown in Table 6, C is a product of the maximum number of transport blocks and a number of code block groups, a number of code block groups is "4", K is a value "4" corresponding to a first information field of DCI1, and a value of T is "2". When a terminal device is configured for single codeword transmission, i.e., the maximum number of transport blocks is "1", and C=1*4=4, then a first bit number N=4*(4−2)=8 bits of feedback acknowledge information is calculated by the calculation formula "N=C*(K−T)". When the terminal device is configured for double codeword transmission, i.e., the maximum number of transport blocks is "2", and C=2*4=8, then a first bit number N=8*(4−2)=16 bits of feedback acknowledge information is calculated by the calculation formula "N=C*(K−T)".

TABLE 6

| Calculation formula | Transmission mode | A first preset value C | A value K corresponding to a first information field in first downlink control information | A second preset value T | A first bit number N(bit) of feedback acknowledge information |
|---|---|---|---|---|---|
| N = C* (K − T) | Single codeword | 1*4 | 4 | 2 | 8 |
| | Double codeword | 2*4 | 4 | 2 | 16 |

It should be noted that the calculation manner when a first preset value is a first constant or a value preconfigured by an access network device or a number of Component Carriers, may be analogously referred to the above two possible calculation manners, and a second preset value is a value predefined through a communication protocol or a value preconfigured by an access network device may also be analogously referred to the above two possible calculation manners, which are not repeated here.

In act 303, if the terminal device does not receive the first downlink control information and receives second downlink control information, a first bit number of feedback acknowledge information to be transmitted in a target transmission unit is determined according to a first information field and a second information field of the second downlink control information.

In at least one implementation, the terminal device determines the first bit number of feedback acknowledge information to be transmitted in the target transmission unit according to the first information field and the second information field of the second downlink control information, comprising but not limited to the following two possible implementations.

In a first possible implementation, a first bit number of feedback acknowledge information to be transmitted in a target transmission unit is calculated by the following formula: N=C*(K'+P) or N=C*(K'+P−1).

K' is a value corresponding to the first information field in the second downlink control information, P is a value corresponding to the second information field in the second downlink control information, and K' and P are positive integers.

It should be noted that relevant descriptions of C and N may refer to the relevant details in the above acts and will not be repeated here.

Figure 7:
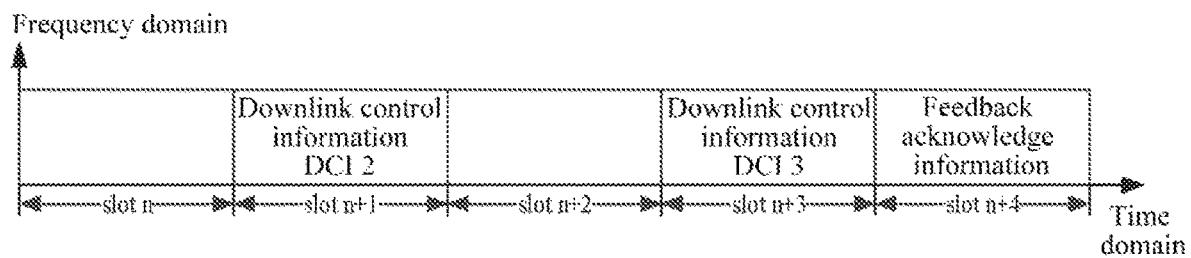
FIG. 7 is a schematic diagram of downlink control information received by a terminal device provided by another example implementation of the present disclosure.

In an illustrative example, an access network device sends downlink control information DCI1 to a terminal device in the n$^{th}$ slot (abbreviated as slot n), where a value k1 corresponding to a first information field in DCI1 is "4" and a value DAI1 corresponding to a second information field is "1"; the access network device sends downlink control information DCI2 to the terminal device in the (n+1)$^{th}$ slot (abbreviated as slot n+1), wherein a value k2 corresponding to a first information field in DCI2 is "3" and a value DAI2 corresponding to a second information field is "2"; and the access network device sends downlink control information DCI3 to the terminal device in the (n+3)$^{th}$ slot (abbreviated as slot n+3), where a value k3 corresponding to a first information field in DCI3 is "1" and a value DAI2 corresponding to a second information field is "3". As shown in FIG. 7, a terminal device does not receive DCI1, but only receive DCI2 and DCI3, and feedback acknowledge information corresponding to each of the three pieces of downlink control information needs to be transmitted in the (n+4)$^{th}$ slot (abbreviated as slot n+4).

In the following, only taking the calculation formula "N=C*(K'+P−1)" as an example, the manner of calculating a first bit number of feedback acknowledge information corresponding to the three pieces of downlink control information comprises but is not limited to the following possible calculation manners.

In a first possible calculation manner, as shown in Table 7, C is the maximum number of transport blocks, K' is a value "3" corresponding to a first information field of DCI2, and P is a value "2" corresponding to a second information field of DCI2. When a terminal device is configured for single codeword transmission, i.e., the maximum number of transport blocks is "1", a value of C is "1", then a first bit number N=1*(3+2−1)=4 bits of feedback acknowledge information is calculated through the calculation formula "N=C*(K'+P−1)". When the terminal device is configured for double codeword transmission, that is, the maximum number of transport blocks is "2", and a value of C is "2", then a first bit number N=2*(3+2−1)=8 bits of feedback acknowledge information is calculated through the calculation formula "N=C*(K'+P−1)".

downlink control information is received, the maximum bit number is calculated according to a first information field and a second information field of the first downlink control information; if the first downlink control information is not

TABLE 7

| Calculation formula | Transmission mode | A first preset value C | A value K' corresponding to a first information field in second downlink control information | A value P corresponding to a second information field in second downlink control information | A first bit number N(bit) of feedback acknowledge information |
|---|---|---|---|---|---|
| N = C* (K' + P − 1) | Single codeword | 1 | 4 | 2 | 4 |
| | Double codeword | 2 | 4 | 2 | 8 |

In a second possible calculation manner, as shown in Table 8, C is a product of the maximum number of transport blocks and a number of code block groups, a number of code block groups is "4", K' is a value "3" corresponding to a first information field of DCI2, and P is a value "2" corresponding to a second information field of DCI2. When a terminal device is configured for single codeword transmission, i.e., the maximum number of transport blocks is "1", C=1*4=4, then a first bit number N=4*(3+2−1)=16 bits of feedback acknowledge information is calculated through the calculation formula "N=C*(K'+P−1)". When the terminal device is configured for double codeword transmission, that is, the maximum number of transport blocks is "2", and C=2*4=8, then a first bit number N=8*(3+2−1)=32 bits of feedback acknowledge information is calculated by the calculation formula "N=C*(K'+P−1)".

received and second downlink control information is received, the maximum bit number is calculated according to a first information field and a second information field of the second downlink control information. Thus the terminal device may calculate and obtain the maximum bit number of feedback acknowledge information regardless of whether the terminal device can receive the first downlink control information or not, and various possible calculation manners are provided for determining the maximum bit number of feedback acknowledge information.

In at least one implementation, the access network device determines the first bit number of feedback acknowledge information to be transmitted in the target transmission unit according to the first information field and the second information field, comprising but not limited to the following two possible implementations.

TABLE 8

| Calculation formula | Transmission mode | A first preset value C | A value K' corresponding to a first information field in second downlink control information | A value P corresponding to a second information field in second downlink control information | A first bit number N(bit) of feedback acknowledge information |
|---|---|---|---|---|---|
| N = C* (K' + P − 1) | Single codeword | 1*4 | 4 | 2 | 16 |
| | Double codeword | 2*4 | 4 | 2 | 32 |

It should be noted that when a calculation formula is "N=C*(K'+P)", a manner of calculating a first bit number of feedback acknowledge information corresponding to the three pieces of downlink control information may be analogously referred to the calculation manner when the calculation formula is "N=C*(K'+P−1)", and will not be repeated here.

In a second possible implementation, a first bit number of feedback acknowledge information to be transmitted in a target transmission unit is calculated by the following formula: N=C*(K'+P−T).

Relevant descriptions of C, K', P, and T may refer to the relevant details in the above acts and will not be repeated here.

It should be noted that a manner of calculating a first bit number of feedback acknowledge information corresponding to downlink control information through the calculation formula "N=C*(K'+P−T)" may be analogously referred to the above-mentioned calculation manners and will not be repeated here.

To sum up, in the implementation of the present disclosure whether first downlink control information is received by a terminal device is also determined, and if the first In a first possible implementation, the access network device calculates the first bit number of feedback acknowledge information to be transmitted in the target transmission unit by the following formula: N=C*(K+1) or N=C*K.

In a second possible implementation, the access network device calculates the first bit number of feedback acknowledge information to be transmitted in the target transmission unit by the following formula: N=C*(K−T).

Relevant descriptions of C, K, and T may refer to the relevant details in the above acts and will not be repeated here.

It should be noted that the calculation manner of the first bit number of feedback acknowledge information at the access network device side may be analogously referred to the calculation manner of the first bit number of feedback acknowledge information at the terminal device side when the terminal device receives the first downlink control information, and will not be repeated here.

Another point to be noted is that a first calculation formula of the first bit number of the feedback acknowledge information at the access network device side and a second calculation formula of the first bit number of the feedback acknowledge information at the terminal device side are preconfigured, and the first calculation formula is the same as the second calculation formula or a formula corresponding to the second calculation formula, so that whether the terminal device receives first downlink control information or not, a first bit number calculated by the access network device through the first calculation formula is greater than or equal to a first bit number calculated by the terminal device through the second calculation formula.

In an illustrative example, a first calculation formula configured at the access network device side is "N=C*K", and a second calculation formula configured at the terminal device side comprises: a corresponding calculation formula "N=C*K" when receiving first downlink control information, and a corresponding calculation formula "N=C*(K'+P−1)" when receiving second downlink control information and not receiving first downlink control information.

Based on a situation of receiving downlink control information by a terminal device shown in FIG. 7, the terminal device does not receive DCI1 but only DCI2 and DCI3, where C is the maximum number of transport blocks, K is "4", K' is "3", P is "2", and the terminal device is configured for single codeword transmission, i.e. the maximum number of transport blocks is "1", then C is "1". Since the terminal device has not received first downlink control information and has received second downlink control information, a first bit number N=1*(3+2−1)=4 bits of feedback acknowledge information is calculated by the calculation formula "N=C*(K'+P−1)". The terminal device transmits three pieces of feedback acknowledge information simultaneously in a target transmission unit according to a first bit number, i.e., transmitting NACK corresponding to DCI1 in a first bit in the target transmission unit, transmitting ACK corresponding to DCI2 in a second bit in the target transmission unit, and transmitting ACK corresponding to DCI3 in a third bit in the target transmission unit. Correspondingly, after sending DCI1, DCI2, and DCI3 to the terminal device, an access network device calculates a first bit number N=1*4=4 bits of feedback acknowledge information through the calculation formula "N=C*K", that is, the access network device receives NACK corresponding to DCI1 in the first bit in the target transmission unit, receives ACK corresponding to DCI2 in the second bit in the target transmission unit and receives ACK corresponding to DCI3 in the third bit in the target transmission unit according to the first bit number "4 bits".

The following is an apparatus implementation of the implementation of the present disclosure. For parts not described in detail in the apparatus implementation, reference may be made to the technical details disclosed in the method implementation.

Figure 8:
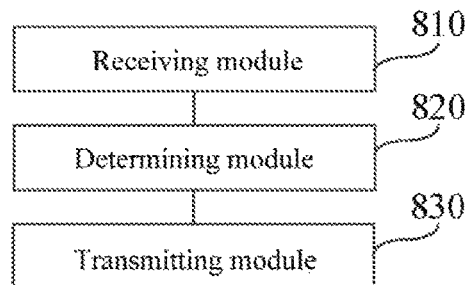
FIG. 8 is a schematic structural diagram of a transmission apparatus of feedback acknowledge information provided by an example implementation of the present disclosure.

Please refer to FIG. 8, which shows a schematic structural diagram of a transmission apparatus of feedback acknowledge information provided by one implementation of the present disclosure. The transmission apparatus of feedback acknowledge information may be implemented as all or part of a terminal device through software, hardware and a combination of the two. The transmission apparatus of feedback acknowledge information comprises a receiving module 810, a determining module 820, and a transmitting module 830.

The receiving module 810 is used for performing functions of the act 202 and other at least one receiving act explicitly or implicitly performed by a terminal device.

The determining module 820 is used for performing functions of the acts 203, 301, 302, 303 and other at least one determining act explicitly or implicitly performed by a terminal device.

The transmitting module 830 is used for performing functions of the act 204 and other at least one transmitting act explicitly or implicitly performed by a terminal device.

Figure 9:
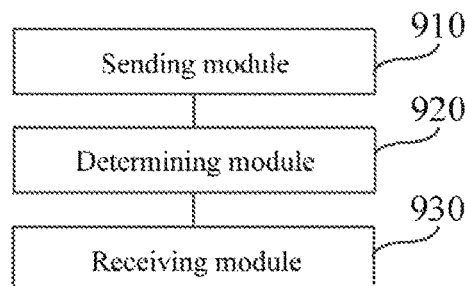
FIG. 9 is a schematic structural diagram of a transmission apparatus of feedback acknowledge information provided by another example implementation of the present disclosure.

Please refer to FIG. 9, which shows a schematic structural diagram of a transmission apparatus of feedback acknowledge information provided by one implementation of the present disclosure. The transmission apparatus of feedback acknowledge information may be implemented as all or part of an access network device through software, hardware and a combination of the two. The transmission apparatus of feedback acknowledge information comprises a sending module 910, a determining module 920, and a receiving module 930.

The sending module 910 is used for performing functions of the act 201 and other at least one sending act explicitly or implicitly performed by an access network device.

The determining module 920 is used for performing functions of the act 205 and other at least one determining act explicitly or implicitly performed by an access network device.

The receiving module 930 is used for performing functions of the act 206 and other at least one receiving act explicitly or implicitly performed by an access network device.

Figure 10:
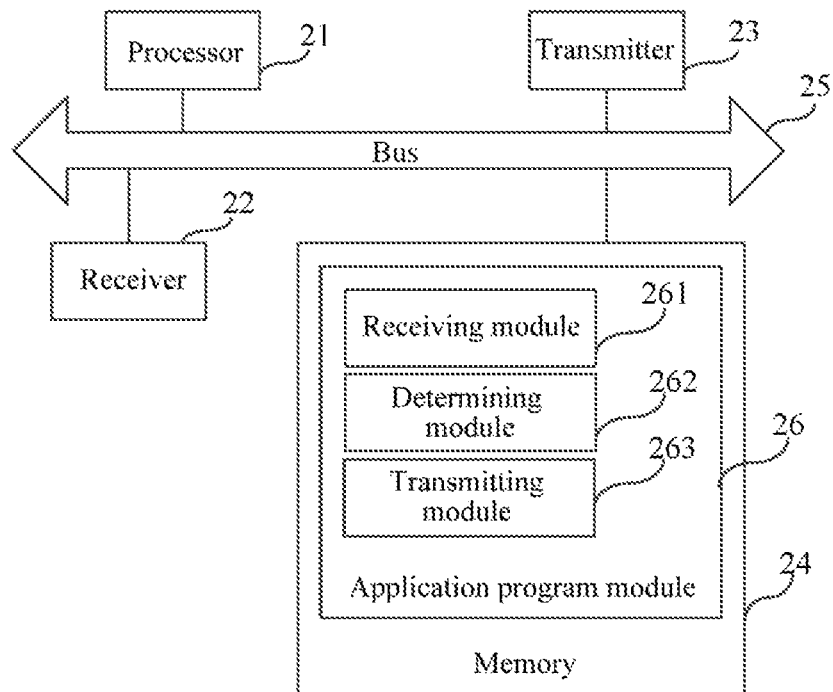
FIG. 10 is a schematic structural diagram of a terminal device provided by an example implementation of the present disclosure.

Please refer to FIG. 10, which shows a schematic structural diagram of a terminal device provided by an example implementation of the present disclosure, which may be the terminal device 140 in the mobile communication system shown in FIG. 1. In the implementation, the case that the terminal device 140 is a UE in an LTE system or a 5G system is taken as an example for description. The terminal device comprises a processor 21, a receiver 22, a transmitter 23, a memory 24, and a bus 25.

The processor 21 comprises one or more processing cores. The processor 21 performs various functional applications and information processing by running software programs and modules.

The receiver 22 and the transmitter 23 may be implemented as a communication component, which may be one communication chip, and the communication chip may comprise a receiving module, a transmitting module, a modulation and demodulation module, etc. for modulating and/or demodulating information and receiving or transmitting information through wireless signals.

The memory 24 is connected to the processor 21 via the bus 25.

The memory 24 may be used for storing software programs and modules.

The memory 24 may store at least one application program module 26 that functions as described. The application program module 26 may comprise a receiving module 261, a determining module 262, and a transmitting module 263.

The receiving module 261 is used for receiving downlink control information sent by an access network device, wherein the downlink control information comprises a first information field and a second information field. The first information field is used for indicating timing of feedback acknowledge information corresponding to the downlink control information, and the second information field is used for indicating a downlink assignment index.

The determining module 262 is used for determining a first bit number of feedback acknowledge information to be transmitted in a target transmission unit according to the first information field and the second information field.

The transmitting module 263 is used for transmitting feedback acknowledge information in the target transmission unit according to the first bit number.

The receiver 22 is used for executing the receiving module 261 to realize functions related to receiving acts in the above-mentioned various method implementations. The processor 21 is used for executing the determining module 262 to realize functions related to determining acts in the above-mentioned various method implementations. The transmitter 23 is used for executing the transmitting module 263 to realize functions related to transmitting acts in the above-mentioned various method implementations.

In addition, the memory 24 may be implemented by any type of transitory or non-transitory storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

Figure 11:
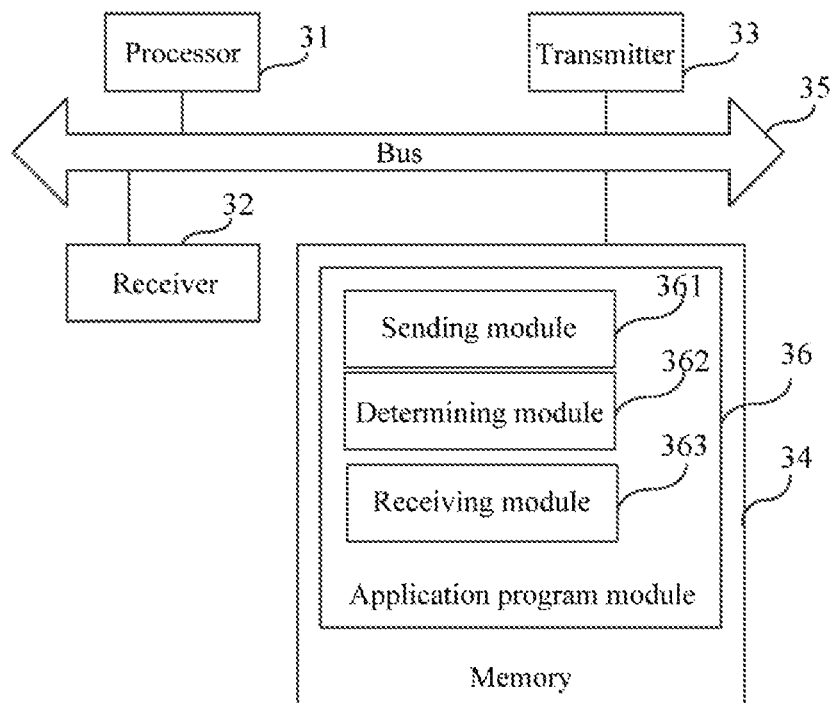
FIG. 11 is a structural diagram of an access network device provided by an example implementation of the present disclosure.

Please refer to FIG. 11, which shows a structural diagram of an access network device provided by an example implementation of the present disclosure. The access network device may be the access network device 120 in the implementation environment shown in FIG. 1. In the implementation, the case that the access network device 120 is an eNB in a LTE system or a gNB in a 5G system is taken as an example for description. The access network device comprises a processor 31, a receiver 32, a transmitter 33, a memory 34, and a bus 35.

The processor 31 comprises one or more processing cores. The processor 31 performs various functional applications and information processing by running software programs and modules.

The receiver 32 and the transmitter 33 may be implemented as a communication component, which may be one communication chip, and the communication chip may comprise a receiving module, a transmitting module, a modulation and demodulation module, etc. for modulating and demodulating information and receiving or transmitting information through wireless signals.

The memory 34 is connected to the processor 31 via the bus 35.

The memory 34 may be used for storing software programs and modules.

The memory 34 may store at least one application program module 36 that functions as described. The application program module 36 may comprise a sending module 361, a determining module 362, and a receiving module 363.

The sending module 361 is used for sending downlink control information to a terminal device, wherein the downlink control information comprises a first information field and a second information field. The first information field is used for indicating timing of feedback acknowledge information corresponding to the downlink control information, and the second information field is used for indicating a downlink assignment index.

The determining module 362 is used for determining a first bit number of feedback acknowledge information to be transmitted in a target transmission unit according to the first information field and the second information field.

The receiving module 363 is used for receiving feedback acknowledge information transmitted by the terminal device in the target transmission unit according to the first bit number.

The transmitter 33 is used for executing the sending module 361 to realize functions related to sending acts in the above-mentioned various method implementations. The processor 31 is used for executing the determining module 362 to realize functions related to determining acts in the above-mentioned various method implementations. The receiver 32 is used for executing the receiving module 363 to realize functions related to receiving acts in the above-mentioned various method implementations.

In addition, the memory 34 may be implemented by any type of transitory or non-transitory storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The implementation of the present disclosure also provides a transmission system of feedback acknowledge information, which comprises a terminal device and an access network device.

The terminal device comprises the transmission apparatus of feedback acknowledge information provided in FIG. 8, and the access network device comprises the transmission apparatus of feedback acknowledge information provided in FIG. 9.

Or, the terminal device comprises the terminal device provided in FIG. 10, and the access network device comprises the access network device provided in FIG. 11.

Those skilled in the art should realize that, in one or more examples described above, the functions described in implementations of the present disclosure may be implemented by using hardware, software, firmware or any combination thereof. When the present disclosure is implemented by software, the above functions may be stored in a computer readable medium or serve as one or multiple instructions or codes on the computer readable medium for transmission. The computer readable medium comprises a computer storage medium and a communication medium, where the communication medium comprises any medium for conveniently transmitting computer programs from one place to another place. The storage medium may be any available medium that a general-purpose computer or a special-purpose computer can access.

The above descriptions are only preferred implementations of the present disclosure and are not intended to limit the present disclosure. Any modification, equivalent substitution, improvement, etc. made within the spirit and principles of the present disclosure shall be comprised within the scope of protection of the present disclosure.

What is claimed is:

1. A method for transmission of feedback acknowledge information, comprising:
   receiving, by a terminal device, downlink control information sent by an access network device, wherein the downlink control information comprises a first information field and a second information field, the first information field is used for indicating timing of feedback acknowledge information corresponding to the downlink control information, and the second information field is used for indicating a downlink assignment index;
   determining, by the terminal device, a first bit number of feedback acknowledge information to be transmitted in a target transmission unit according to the first information field and the second information field; and
   transmitting, by the terminal device, the feedback acknowledge information in the target transmission unit according to the first bit number;
   wherein the downlink control information comprises first downlink control information and second downlink control information, a value of the second information field of the first downlink control information is a preset value, and a value of the second information field of the second downlink control information is different from the preset value;

wherein the feedback acknowledge information comprises feedback acknowledge information corresponding to the first downlink control information and the second downlink control information; and wherein the first bit number comprises the maximum bit number of feedback acknowledge information corresponding to all component carriers.

2. The method according to claim 1, wherein the timing of feedback acknowledge information corresponding to the downlink control information comprises:

a time interval between downlink data scheduled through the downlink control information and feedback acknowledge information corresponding to the downlink data; or, a time interval between the downlink control information and feedback acknowledge information corresponding to the downlink control information.

3. The method according to claim 1, wherein the determining, by the terminal device, the first bit number of feedback acknowledge information to be transmitted in the target transmission unit according to the first information field and the second information field, comprises:

when the terminal device receives the first downlink control information, calculating the first bit number of the feedback acknowledge information to be transmitted in the target transmission unit through a following formula:

$$N=C*(K+1) \text{ or } N=C*K;$$

wherein the C is a first preset value, the K is a value corresponding to the first information field in the first downlink control information, and both C and K are positive integers;

or, when the terminal device receives first downlink control information, calculating the first bit number of the feedback acknowledge information to be transmitted in the target transmission unit through a following formula:

$$N=C*(K-T);$$

wherein the C is a first preset value, the K is a value corresponding to the first information field in the first downlink control information, the T is a second preset value, the C, T, and K are positive integers, and T is less than K;

or, determining the first bit number of feedback acknowledge information to be transmitted in the target transmission unit according to the first information field and the second information field of the second downlink control information when the terminal device does not receive first downlink control information and receives second downlink control information.

4. The method according to claim 3, wherein when the terminal device does not receive the first downlink control information and receives the second downlink control information, the determining the first bit number of the feedback acknowledge information to be transmitted in the target transmission unit according to the first information field and the second information field of the second downlink control information, comprises:

when the terminal device does not receive the first downlink control information and receives the second downlink control information, calculating the first bit number of the feedback acknowledge information transmitted in the target transmission unit through a following formula:

$$N=C*(K'+P) \text{ or } N=C*(K'+P-1);$$

wherein the C is a first preset value, K' is a value corresponding to the first information field in the second downlink control information, the P is a value corresponding to the second information field in the second downlink control information, and C, K', and P are all positive integers.

5. The method according to claim 3, wherein when the terminal device does not receive the first downlink control information and receives the second downlink control information, the determining the first bit number of the feedback acknowledge information to be transmitted in the target transmission unit according to the first information field and the second information field of the second downlink control information, comprises:

when the terminal device does not receive the first downlink control information and receives the second downlink control information, calculating the first bit number of the feedback acknowledge information transmitted in the target transmission unit through a following formula:

$$N=C*(K'+P-T);$$

wherein the C is a first preset value, the K' is a value corresponding to the first information field in the second downlink control information, the P is a value corresponding to the second information field in the second downlink control information, the T is a second preset value, and C, K', P, and T are all positive integers.

6. The method according to claim 1, wherein if the terminal device receives the first downlink control information from the access network device, the terminal device determines a first bit number of feedback acknowledge information to be transmitted in a target transmission unit according to a first information field and a second information field of the first downlink control information, and a value of the second information field of the first downlink control information is 1.

7. A terminal device comprising: a processor, a receiver, and a transmitter;

wherein the receiver is configured to receive downlink control information sent by an access network device, wherein the downlink control information comprises a first information field and a second information field, the first information field is used for indicating timing of feedback acknowledge information corresponding to the downlink control information, and the second information field is used for indicating a downlink assignment index;

wherein the processor is configured to determine a first bit number of feedback acknowledge information to be transmitted in a target transmission unit according to the first information field and the second information field;

wherein the transmitter is configured to transmit the feedback acknowledge information in the target transmission unit according to the first bit number;

wherein the downlink control information comprises first downlink control information and second downlink control information, a value of the second information field of the first downlink control information is a preset value, and a value of the second information field of the second downlink control information is different from the preset value;

wherein the feedback acknowledge information comprises feedback acknowledge information corresponding to the first downlink control information and the second downlink control information; and wherein the first bit number comprises the maximum bit number of feedback acknowledge information corresponding to all component carriers.

8. The terminal device according to claim 7, wherein the timing of feedback acknowledge information corresponding to the downlink control information comprises:

a time interval between downlink data scheduled through the downlink control information and feedback acknowledge information corresponding to the downlink data; or, a time interval between the downlink control information and feedback acknowledge information corresponding to the downlink control information.

9. The terminal device according to claim 7, wherein the processor is further configured to calculate the first bit number of the feedback acknowledge information to be transmitted in the target transmission unit through a following formula when the receiver receives the first downlink control information:

$$N=C*(K+1) \text{ or } N=C*K;$$

wherein the C is a first preset value, the K is a value corresponding to the first information field in the first downlink control information, and both C and K are positive integers;

or, the processor is further configured to calculate the first bit number of the feedback acknowledge information to be transmitted in the target transmission unit through a following formula when the receiver receives the first downlink control information:

$$N=C*(K-T);$$

wherein the C is a first preset value, the K is a value corresponding to the first information field in the first downlink control information, the T is a second preset value, the C, T, and K are positive integers, and T is less than K or, the processor is further configured to determine the first bit number of the feedback acknowledge information to be transmitted in the target transmission unit according to the first information field and the second information field of the second downlink control information when the receiver does not receive the first downlink control information and receives the second downlink control information.

10. The terminal device according to claim 7, wherein upon determining that the receiver receives first downlink control information sent by the access network device, the processor determines a first bit number of feedback acknowledge information to be transmitted in a target transmission unit according to a first information field and a second information field of the first downlink control information, and a value of the second information field of the first downlink control information is 1.

11. The terminal device according to claim 9, wherein the second preset value is used for indicating a minimum delay for transmitting the feedback acknowledge information.

12. The terminal device according to claim 9, wherein the first preset value comprises:
a first constant; or,
a value preconfigured by the access network device; or,
a maximum number of transport blocks; or,
a product of the maximum number of transport blocks and a number of code block groups; or,
a number of Component Carriers.

13. The terminal device according to claim 9, wherein the second preset value comprises:
a second constant; or
a value predefined through a communication protocol; or,
a value preconfigured by the access network device.

14. An access network device comprising: a processor, a transmitter, and a receiver;

wherein the transmitter is configured to send downlink control information to a terminal device, wherein the downlink control information comprises a first information field and a second information field, the first information field is used for indicating timing of feedback acknowledge information corresponding to the downlink control information, and the second information field is used for indicating a downlink assignment index;

wherein the processor is configured to determine a first bit number of feedback acknowledge information to be transmitted in a target transmission unit according to the first information field and the second information field;

wherein the receiver is configured to receive the feedback acknowledge information transmitted by the terminal device in the target transmission unit according to the first bit number;

wherein the downlink control information comprises first downlink control information and second downlink control information, a value of the second information field of the first downlink control information is a preset value, and a value of the second information field of the second downlink control information is different from the preset value;

wherein the feedback acknowledge information comprises feedback acknowledge information corresponding to the first downlink control information and the second downlink control information; and wherein the first bit number comprises the maximum bit number of feedback acknowledge information corresponding to all component carriers.

15. The access network device according to claim 14, wherein the timing of feedback acknowledge information corresponding to the downlink control information comprises:

a time interval between downlink data scheduled through the downlink control information and feedback acknowledge information corresponding to the downlink data; or, a time interval between the downlink control information and feedback acknowledge information corresponding to the downlink control information.

16. The access network device according to claim 14, wherein the processor is further configured to calculate the first bit number of the feedback acknowledge information to be transmitted in the target transmission unit according to the first information field and the second information field through a following formula:

$$N=C*(K+1) \text{ or } N=C*K;$$

wherein a value of the second information field of the downlink control information is a preset value, the C is a first preset value, the K is a value corresponding to the first information field in the downlink control information, and both C and K are positive integers;

or, the processor is further configured to calculate the first bit number of the feedback acknowledge information to be transmitted in the target transmission unit according to the first information field and the second information field through a following formula:

$N=C*(K-T)$;

wherein a value of the second information field of the downlink control information is a preset value, the C is a first preset value, the K is a value corresponding to the first information field in the downlink control information, the T is a second preset value, the C, T, and K are positive integers, and T is less than K.

17. The access network device according to claim 14, wherein upon determining that the transmitter sends downlink control information to the terminal device, the processor determines a first bit number of feedback acknowledge information to be transmitted in a target transmission unit according to a first information field and a second information field of the downlink control information, and a value of the second information field of the downlink control information is 1.

* * * * *